(12) United States Patent
Qiu et al.

(10) Patent No.: US 11,506,760 B2
(45) Date of Patent: Nov. 22, 2022

(54) LIDAR AND LIDAR CONTROL METHOD

(71) Applicant: SUTENG INNOVATION TECHNOLOGY CO., LTD., Shenzhen (CN)

(72) Inventors: Chunxin Qiu, Shenzhen (CN); Letian Liu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 715 days.

(21) Appl. No.: 16/396,753

(22) Filed: Apr. 28, 2019

(65) Prior Publication Data

US 2019/0331772 A1     Oct. 31, 2019

Related U.S. Application Data

(63) Continuation of application No. PCT/CN2019/081079, filed on Apr. 2, 2019.

(30) Foreign Application Priority Data

Apr. 3, 2018    (CN) .......................... 201810287841.3

(51) Int. Cl.
    *G01S 7/481*       (2006.01)
    *G02B 26/10*      (2006.01)
               (Continued)

(52) U.S. Cl.
    CPC .......... *G01S 7/4817* (2013.01); *G01S 7/4814* (2013.01); *G01S 7/4815* (2013.01); *G01S 17/02* (2013.01);
               (Continued)

(58) Field of Classification Search
    CPC ..... G02B 26/10; G02B 26/0816; G01S 17/66; G01S 7/4815; G01S 17/02; G01S 7/4814; G01S 7/4817
    See application file for complete search history.

(56) References Cited

U.S. PATENT DOCUMENTS 6,396,577 B1 *   5/2002   Ramstack ............. F41H 13/005
                                                  250/203.2
9,128,190 B1 *   9/2015   Ulrich ..................... G02B 26/08
(Continued)

FOREIGN PATENT DOCUMENTS

CN       107153198 A    9/2017
CN       107656258 A    2/2018
(Continued)

OTHER PUBLICATIONS

International Search Report issued in corresponding International Application No. PCT/CN2019/081079, dated Jun. 27, 2019, 5 pages.

*Primary Examiner* — Sang H Nguyen
(74) *Attorney, Agent, or Firm* — Bayes PLLC

(57) ABSTRACT

The present disclosure provides a lidar and a lidar control method. The lidar includes a plurality of laser transmitters configured to transmit laser light, and an oscillating mirror configured to change a direction of a light path of the transmitted laser light. The lidar control method includes transmitting, by a plurality of transmitters, laser light; and changing, by an oscillating mirror, a direction of a light path of the transmitted laser light. The plurality of laser transmitters constitute a laser transmitter array of M rows and N columns, where M is an integer greater than or equal to 2 and N is an integer greater than or equal to 2.

11 Claims, 8 Drawing Sheets

(51) Int. Cl.
*G02B 26/08* (2006.01)
*G01S 17/66* (2006.01)
*G01S 17/02* (2020.01)

(52) U.S. Cl.
CPC .......... *G01S 17/66* (2013.01); *G02B 26/0816* (2013.01); *G02B 26/10* (2013.01)

(56) References Cited

U.S. PATENT DOCUMENTS

| | | | |
|---|---|---|---|
| 2011/0216792 A1* | 9/2011 | Chann | H01S 5/405 |
| | | | 372/31 |
| 2014/0063483 A1 | 3/2014 | Li | |
| 2015/0131080 A1* | 5/2015 | Retterath | G01S 7/4815 |
| | | | 356/5.01 |
| 2015/0219764 A1* | 8/2015 | Lipson | H01S 5/00 |
| | | | 356/4.01 |
| 2016/0327635 A1* | 11/2016 | Scheim | G01S 7/4815 |
| 2017/0102451 A1* | 4/2017 | O'Leary | G01S 15/87 |
| 2017/0350965 A1* | 12/2017 | Schmalenberg | G01S 7/4817 |
| 2019/0011567 A1* | 1/2019 | Pacala | G01S 17/88 |
| 2019/0101644 A1* | 4/2019 | DeMersseman | G01S 17/931 |
| 2019/0146071 A1* | 5/2019 | Donovan | G01S 7/4868 |
| | | | 356/5.01 |

FOREIGN PATENT DOCUMENTS

| | | |
|---|---|---|
| CN | 108490444 A | 9/2018 |
| CN | 208092227 U | 11/2018 |

\* cited by examiner

LIDAR AND LIDAR CONTROL METHOD

CROSS-REFERENCE TO RELATED APPLICATION(S)

This application is continuation of International Application No. PCT/CN2019/081079, filed Apr. 2, 2019, entitled "LIDAR AND LIDAR CONTROL METHOD," which claims priority to Chinese Patent Application No. 201810287841.3, filed on Apr. 3, 2018, entitled "LIDAR AND LIDAR CONTROL METHOD," the entire contents of which are incorporated by reference.

TECHNICAL FIELD

The present disclosure relates to the field of detection, and more particularly to a lidar and a lidar control method.

BACKGROUND

Lidar is a radar system that emits laser beam to detect features of a target, such as position, velocity, etc. The working principle is first transmitting a laser beam signal to the target to detect, and then comparing the received signal reflected from the target with the transmitted signal. After processing, information about the target, such as parameters related to distance, position, altitude, speed, attitude, and even shape of the target, can be obtained.

Lidars include mechanical lidars and solid-state lidars. A solid-state lidar can use a oscillating mirror to convert single-beam laser light into multi-beam laser light, thereby saving cost.

The frequency/scanning angle of the oscillating mirror used in a solid-state lidar is inversely proportional to the area of the mirror surface of the oscillating mirror. When the frequency is high or the scanning angle is large, the mirror surface of the oscillating mirror is small. The spot diameter of the laser light of a laser transmitter needs to match the mirror surface of the oscillating mirror. In the existing solid-state lidars, the frequency/scanning angle of the oscillating mirror cannot meet the frequency and scanning angle requirements of the current mainstream lidar. In addition, usually a solid-state lidar employs only one laser transmitter, and the repetition frequency of a single laser transmitter is insufficient, resulting in a sparse point cloud and a low resolution.

SUMMARY

The embodiments of the present disclosure provide a lidar and a lidar control method which may increase the scanning angle of the lidar, and may also increase the resolution of the lidar.

In order to solve the above technical problems, the embodiments of the present disclosure provide the following technical solutions.

In accordance with a first aspect of the present disclosure, a lidar is provided. The lidar may include a plurality of laser transmitters configured to transmit laser light, and an oscillating mirror configured to change a direction of a light path of the transmitted laser light.

In some embodiments, the plurality of laser transmitters constitute a laser transmitter array of M rows and N columns, where M is an integer greater than or equal to 2 and N is an integer greater than or equal to 2.

In some embodiments, the included angle between laser light transmitted by a laser transmitter and a horizontal plane is a first included angle, and the laser transmitters in the same row have a same first included angle.

The laser transmitters in different rows have different first included angles.

In some embodiments, the included angle between laser light transmitted by two adjacent laser transmitters in the same row is a second included angle, and a plurality of second included angles are nonzero.

In some embodiments, a plurality of second included angles may be identical for the laser transmitters in the same row.

In some embodiments, a plurality of second included angles may be different for the laser transmitters in the same row.

In some embodiments, the lidar may further include a transmission collimating unit arranged between the laser transmitters and the oscillating mirror, configured to collimate the laser light transmitted by the laser transmitters.

In some embodiments, a light exit of the plurality of laser transmitters is arranged at a focal plane of the transmission collimating unit.

In accordance with a second aspect of the present disclosure, a lidar control method is provided. The method may include transmitting, by a plurality of transmitters, laser light, and changing, by an oscillating mirror, a direction of a light path of the transmitted laser light.

In some embodiments, the plurality of laser transmitters constitute a laser transmitter array of M rows and N columns, where M is an integer greater than or equal to 2 and N is an integer greater than or equal to 2.

In some embodiments, the included angle between laser light transmitted by a laser transmitter and a horizontal plane is a first included angle, the laser transmitters in the same row have a same first included angle.

The laser transmitters in different rows have different first included angles.

In some embodiments, the included angle between laser light transmitted by two adjacent laser transmitters in the same row is a second included angle, and a plurality of second included angles are nonzero.

The embodiments according to the present disclosure disclose a lidar. The lidar may include M×N laser transmitters configured to transmit laser light, and an oscillating mirror configured to change a direction of a light path of the transmitted laser light. The M×N laser transmitters constitute a laser transmitter array of M rows and N columns, where M is an integer greater than or equal to 2 and N is an integer greater than or equal to 2. The lidar of the embodiments of the present disclosure employs a plurality of laser transmitters, the scanning area of the lidar of the embodiments of the present disclosure is bigger than that of lidars with a single laser transmitter, thus increasing the scanning angle of the lidar. Moreover, the lidar according to the embodiments of the present disclosure employs a plurality of laser transmitters, and the scanning area of the laser light transmitted by the plurality of laser transmitters may partially overlap. Therefore, the resolution may be raised substantially in the overlapped scanning area, thus increasing the resolution of the lidar.

BRIEF DESCRIPTION OF THE DRAWINGS

In order to more clearly illustrate the embodiments of the present disclosure, the drawings to be used in the embodiments will be briefly described below. The drawings in the following description represent only some embodiments according to the present disclosure. Those skilled in the art can obtain other drawings according to these drawings without any creative work.

DETAILED DESCRIPTION

The embodiments of the present disclosure provide a lidar and a lidar control method, which is able to increase the scanning angle and the resolution of the lidar.

Technical solutions in the embodiments of the present disclosure will be described clearly and completely hereinafter with reference to the accompanying drawings consistent with some embodiments of the present disclosure. The described embodiments are merely some, rather than all embodiments of the present disclosure. All other embodiments obtained by those of ordinary skill in the art based on the embodiments of the present disclosure without creative efforts shall fall within the protecting scope of the present disclosure.

Figure 1:
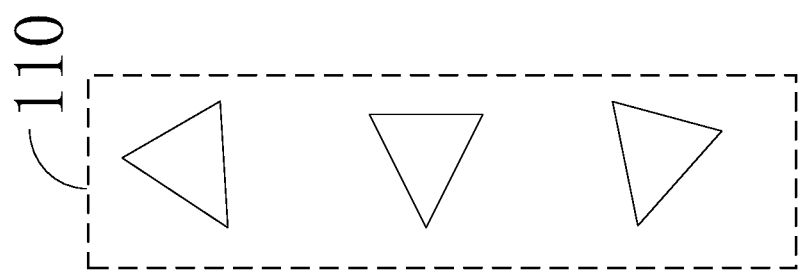
FIG. 1 illustrates a top schematic view of a lidar, consistent with some embodiments of the present disclosure.
Figure 1:
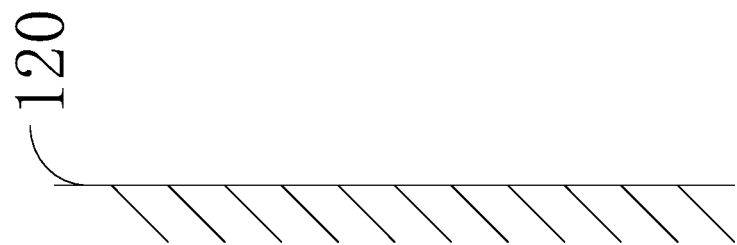

FIG. 1 illustrates a top schematic view of a lidar, consistent with some embodiments of the present disclosure. As shown in FIG. 1, the lidar may include a plurality of laser transmitters 110, configured to transmit laser light, and an oscillating mirror 120, configured to change a direction of a light path of the transmitted laser light.

FIG. 1 illustrates a top schematic view which displays only one row of laser transmitters.

Figure 2:
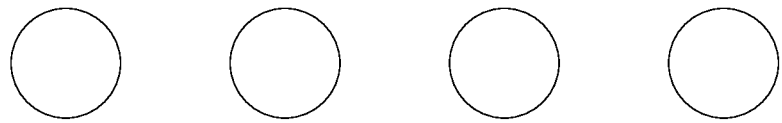
FIG. 2 illustrates a schematic diagram of an arrangement of laser transmitters of a lidar, consistent with some embodiments of the present disclosure.
Figure 2:
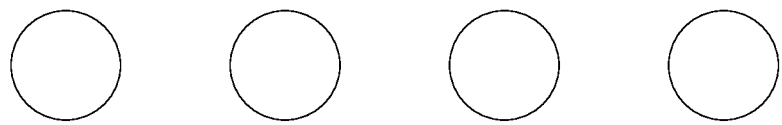
Figure 2:
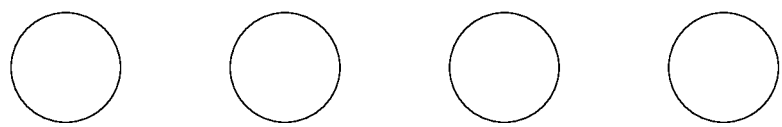
Figure 2:
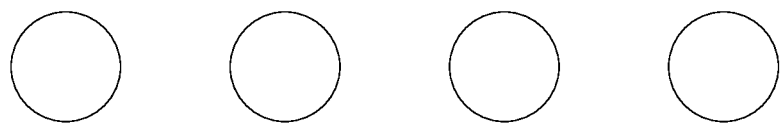

FIG. 2 illustrates a schematic diagram of an arrangement of laser transmitters of a lidar, consistent with some embodiments of the present disclosure and also with reference to FIG. 1. As shown in FIG. 2, the plurality of laser transmitters may constitute a laser transmitter array of M rows and N columns, where M is an integer that is greater than or equal to 2, and N is an integer that is greater than or equal to 2.

In some embodiments, the scanning areas corresponding to the laser light transmitted by the M×N laser transmitters may partially overlap. "Partially overlap" may indicate that the scanning areas by adjacent laser transmitters in the same row may partially overlap, or that the scanning areas by adjacent laser transmitters in the same column may partially overlap, or that the scanning area by a first laser transmitter may simultaneously partially overlap with those by other laser transmitters that are adjacent with the first laser transmitter in the same row or in the same column, or that the scanning areas by laser transmitters not adjacent with each other may partially overlap.

In some embodiments, the oscillating mirror may be a mechanical oscillating mirror, or a MEMS (Micro-Electro-Mechanical Systems) mirror.

The lidar according to the embodiments of the present disclosure employs a plurality of laser transmitters, and the scanning area of the lidar according to the embodiments of the present disclosure is bigger than that of lidars with a single laser transmitter, thus increasing the scanning angle of the lidar. Moreover, the lidar according to the embodiments of the present disclosure employs a plurality of laser transmitters, and the scanning area of the plurality of laser transmitters may partially overlap. Therefore, the resolution may be raised substantially in the overlapped scanning areas, thus increasing the resolution of the lidar.

Figure 3:
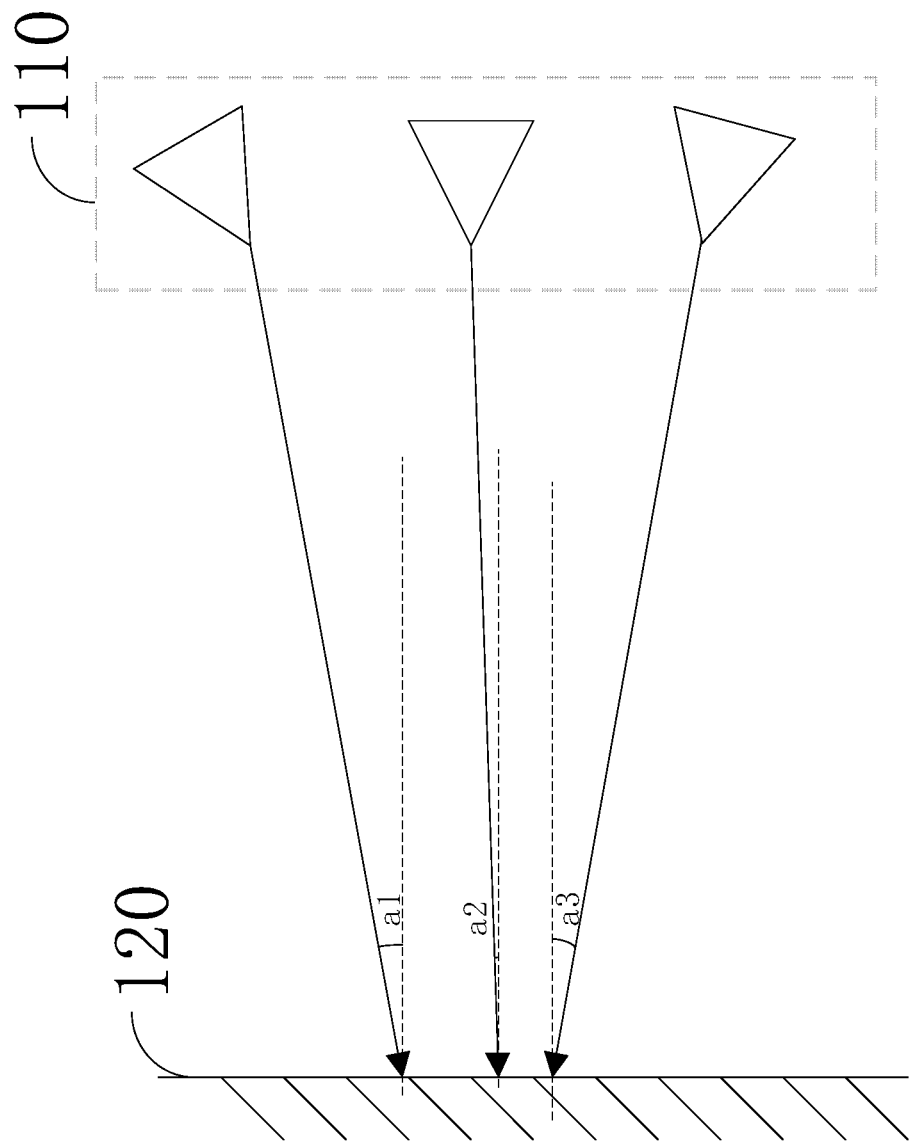
FIG. 3 illustrates a schematic diagram of a lidar, consistent with some embodiments of the present disclosure.

FIG. 3 illustrates a schematic diagram of a lidar, consistent with some embodiments of the present disclosure. As shown in FIG. 3, an included angle between laser light transmitted by a laser transmitter and a horizontal plane is a first included angle, and the first included angles corresponding to the laser transmitters in the same row are the same.

In some embodiments, the first included angles corresponding to the laser transmitters in different rows are different.

For illustration purposes, FIG. 3 only shows a first laser transmitter in each row. The first included angles corresponding to the other laser transmitters in the same row are the same as that corresponding to the first laser transmitter, so these laser transmitters are shielded in FIG. 3.

As shown in FIG. 3, the first included angles corresponding to the laser transmitters in the first row are $a1$, the first included angles corresponding to the laser transmitters in the second row are $a2$, the first included angles corresponding to the laser transmitters in the third row are $a3$, wherein $a1 \neq a2 \neq a3$.

Figure 4:
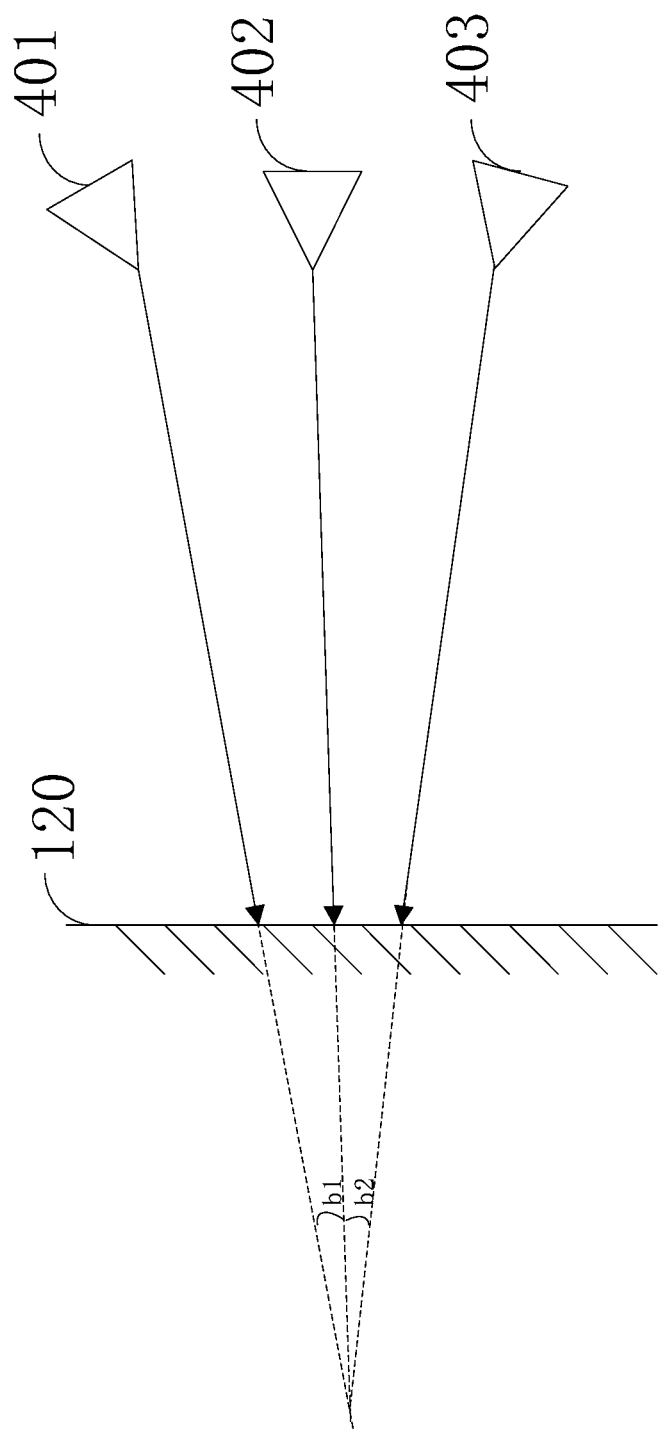
FIG. 4 illustrates a top schematic view of a lidar, consistent with some embodiments of the present disclosure.

FIG. 4 illustrates a top schematic view of a lidar, consistent with some embodiments of the present disclosure. As show in FIG. 4, an included angle between laser light transmitted by two adjacent laser transmitters in the same row is a second included angle, and a plurality of second included angles are nonzero.

For illustration purposes, FIG. 4 shows three laser transmitters 401, 402, 403 in the same row. The included angle between laser light transmitted respectively by laser transmitter 401 and laser transmitter 402 is $b1$, and the included angle between laser light transmitted respectively by laser transmitter 402 and laser transmitter 403 is $b2$, wherein $b1 \neq 0$ and $b2 \neq 0$.

In some embodiments, a plurality of second included angles may be identical for the laser transmitters in the same row. As shown in FIG. 4, $b1=b2 \neq 0$. In other embodiments, a plurality of second included angles may be different for the laser transmitters in the same row.

In some embodiments, the lidar further includes a transmission collimating unit arranged between the laser transmitters and the oscillating mirror, configured to collimate the laser light transmitted by the laser transmitters.

In some embodiments, a light exit of the plurality of laser transmitters is arranged at the focal plane of the transmission collimating unit.

In some embodiments, after being collimated by the transmission collimating unit, the laser light transmitted by the laser transmitters is orientated by the oscillating mirror both horizontally and vertically.

The lidar according to the embodiments of the present disclosure employs a two-dimensional (2D) oscillating mirror. A 2D oscillating mirror is able to change the direction of laser light in two directions, for example, changing the direction of laser light in both horizontal and vertical directions. This turns the laser light transmitted by a single laser transmitter into an area array of laser light point clouds equivalent to laser light transmitted by a laser transmitter array.

The lidar according to the embodiments of the present disclosure employs an M×N laser transmitter array. According to the configurations of the embodiments above, a laser transmitter may transmit a point cloud array of laser light, and thus scanning areas of the laser transmitters may overlap.

Figure 5:
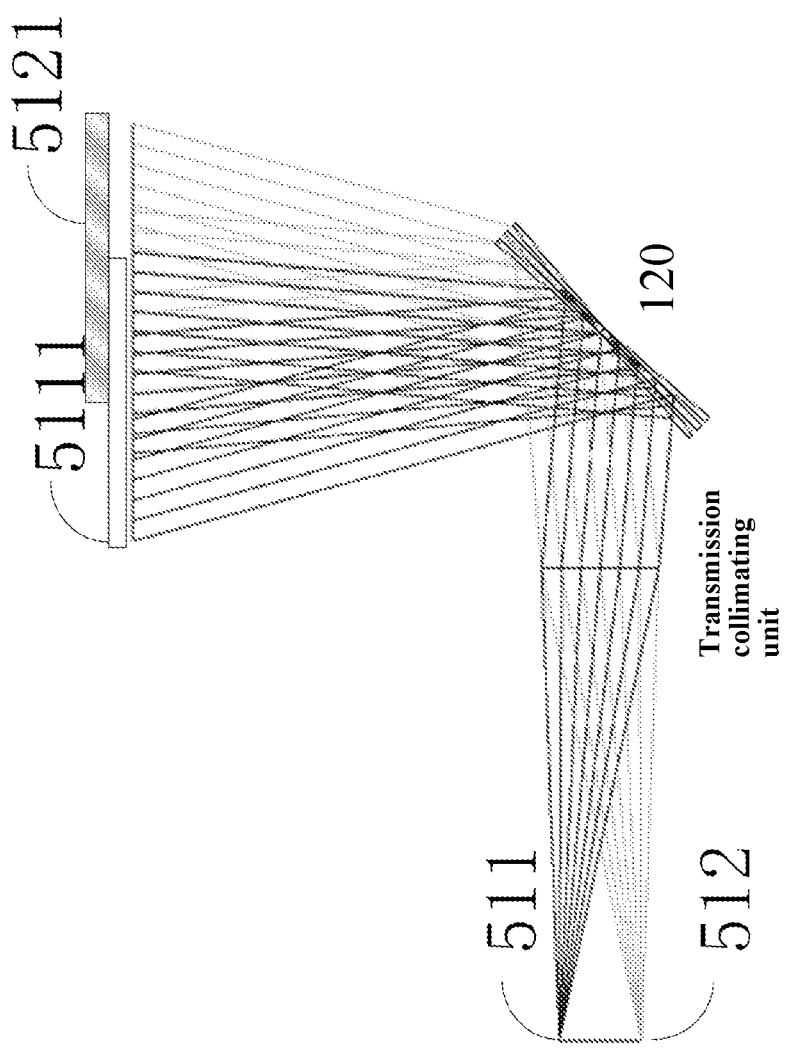
FIG. 5 illustrates a schematic diagram of scanning areas of a lidar, consistent with some embodiments of the present disclosure.

FIG. 5 illustrates a schematic diagram of scanning areas of a lidar, consistent with some embodiments of the present disclosure. As shown in FIG. 5, the lidar shows only two laser transmitters 511 and 512, the scanning areas of which are 5111 and 5121 respectively.

The scanning area of a laser transmitter of a lidar varies with the angle between laser light transmitted by the laser transmitter and the horizontal plane, and the angle between laser light transmitted by the laser transmitter and the optical axis of the transmission collimating unit.

The following describes some embodiments of overlapping scanning areas.

Figure 6:
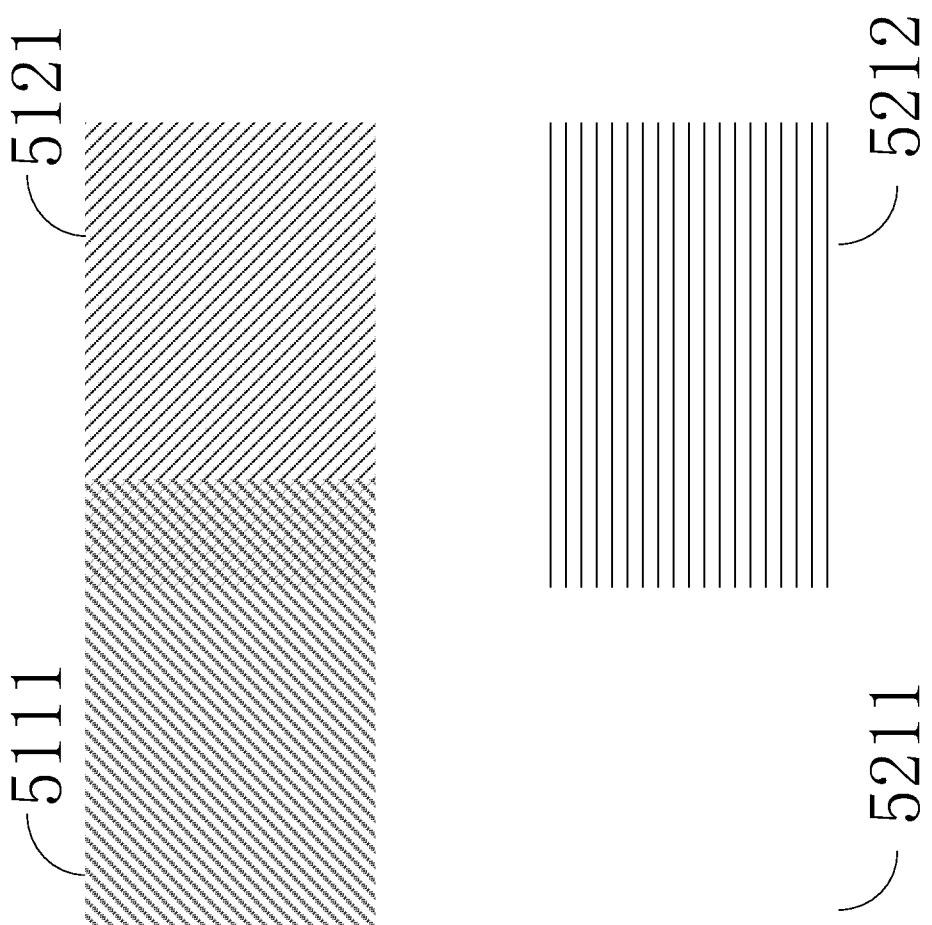
FIG. 6 illustrates a schematic diagram of scanning areas of a lidar, consistent with some embodiments of the present disclosure.

FIG. 6 illustrates a schematic diagram of scanning areas of a lidar in the embodiments of the present disclosure. FIG. 6 is a sectional view of the scanning areas. Referring to FIG. 5, scanning area 5111 and scanning area 5121 may overlap, and scanning area 5211 and scanning area 5121 may overlap.

FIG. 6 illustrates an overlapping of scanning areas of adjacent laser transmitters in the same row.

Figure 7:
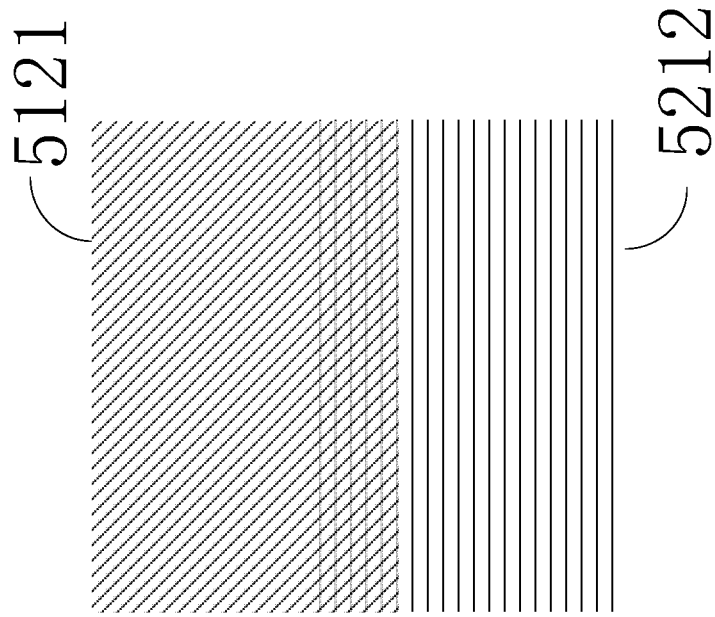
FIG. 7 illustrates a schematic diagram of scanning areas of a lidar, consistent with some embodiments of the present disclosure.
Figure 7:
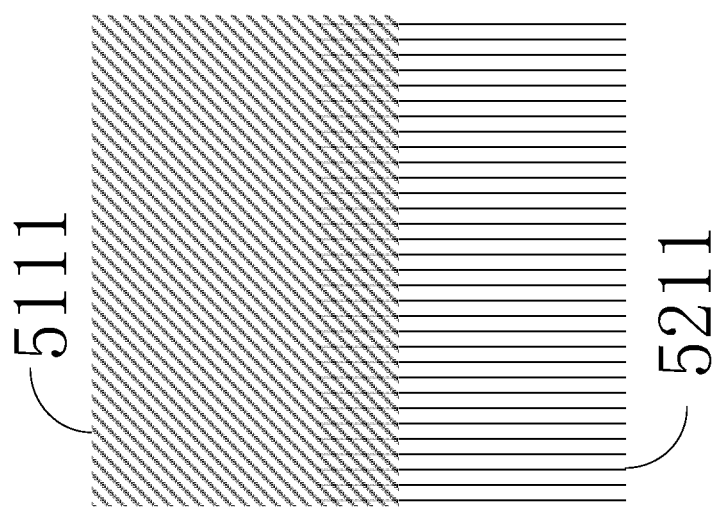

FIG. 7 illustrates a schematic diagram of scanning areas of a lidar, consistent with some embodiments of the present disclosure. FIG. 7 is a sectional view of the scanning areas. Referring to FIG. 5, scanning area 5111 and scanning area 5211 may overlap, and scanning area 5121 and scanning area 5221 may overlap.

FIG. 7 illustrates an overlapping of scanning areas of adjacent laser transmitters in the same column.

Figure 8:
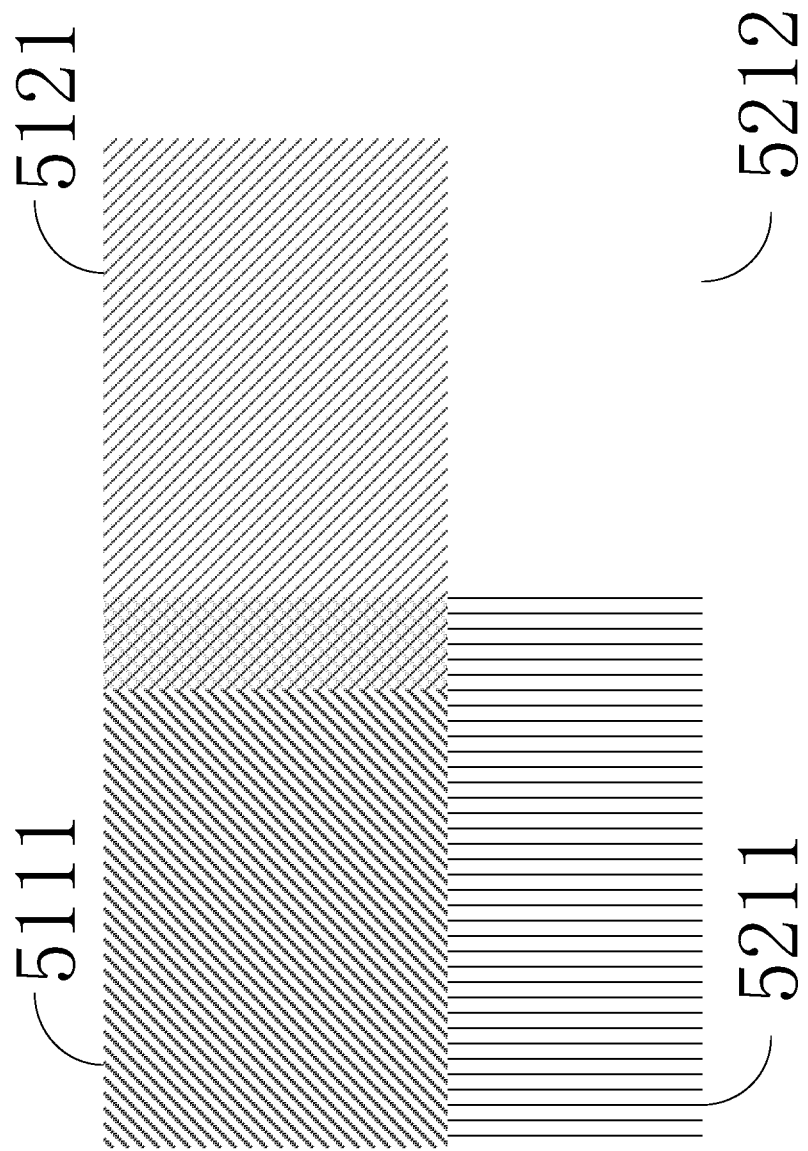
FIG. 8 illustrates a schematic diagram of scanning areas of a lidar, consistent with some embodiments of the present disclosure.

FIG. 8 illustrates a schematic diagram of scanning areas of a lidar, consistent with some embodiments of the present disclosure. FIG. 8 is a sectional view of scanning areas. Referring to FIG. 5, each scanning area may overlap with any of the other three scanning areas. For example, scanning area 5111 may overlap with any of scanning area 5121, scanning area 5211, and scanning area 5212.

FIG. 8 illustrates that the scanning area by a laser transmitter may simultaneously partially overlap with those by other laser transmitters that are adjacent with the laser transmitter in the same row or in the same column.

In practical applications, the overlapping manners regarding the scanning areas are not limited to the embodiments above. Resolution in the overlapping scanning area may be increased.

As shown in FIGS. 6 to 8, the scanning area of a single laser transmitter may be small. For example, the scanning area of laser transmitter 511 is 5111. The scanning area (or the scanning angle) of multiple laser transmitters may increase. For example, the scanning area of four laser transmitters as shown in FIGS. 6 to 8 may be the combined area of scanning area 5111, scanning area 5121, scanning area 5211, and scanning area 5221.

The lidar according to the embodiments of the present disclosure may increase the scanning angle of the lidar and may also increase the resolution of the lidar.

In accordance with the lidar above, the present disclosure further provides a lidar control method, which may include transmitting, by a plurality of laser transmitters, laser light, and changing, by an oscillating mirror, a direction of a light path of the transmitted laser light.

In some embodiments, the plurality of laser transmitters constitutes a laser transmitter array of M rows and N columns, wherein M is an integer greater than or equal to 2 and N is an integer greater than or equal to 2.

In some embodiments, an included angle between laser light transmitted by the laser transmitters and a horizontal plane is a first included angle, and the first included angles corresponding to the laser transmitters in the same row are the same.

The first included angles corresponding to the laser transmitters in different rows are different.

In some embodiments, an included angle between laser light transmitted by two adjacent laser transmitters in the same row is a second included angle, and a plurality of second included angles are nonzero.

The lidar control method according to the embodiments of the present disclosure may increase the scanning angle of the lidar, and may also increase the resolution of the lidar.

The embodiments of the present disclosure provide a lidar and a lidar control method. The lidar according to the embodiments of the present disclosure employs a plurality of laser transmitters, the scanning area of which is bigger than that of lidars with a single laser transmitter, thus increasing the scanning angle of the lidar. Moreover, the lidar according to the embodiments of the present disclosure employs a plurality of laser transmitters, the scanning areas of which may partially overlap, and the resolution may be raised substantially in the overlapped scanning areas, thus increasing the resolution of the lidar.

Those skilled in the art can clearly understand that the technology in the embodiments of the present disclosure can be implemented by software and universal hardware including general purpose integrated circuits, general purpose CPUs, general purpose memories, general purpose components, etc. It is also possible to use dedicated hardware including dedicated ASICs, dedicated CPUs, dedicated memories, dedicated components, etc. to implement the embodiments of the present disclosure. The technical solutions in the embodiments of the present disclosure or the part that excels over the prior art can be embodied in the form of a software product. The software product can be stored in a storage medium, such as a read-only memory (ROM), a random access memory (RAM), a disk, a CD, etc. The software product may include a number of instructions to instruct a computer device (e.g. a personal computer, a server, a network device, etc.) to perform the various embodiments of the present disclosure or the method described in the embodiments.

The various embodiments in the specification are described in a progressive manner, and the same or similar parts between various embodiments may be referred between each other, and each embodiment focuses on the description of differences from other embodiments. In particular, for the system embodiment, since it is basically similar to the method embodiment, the description is relatively simple, and the related embodiments can refer to the portion of the specification regarding the method embodiments.

The embodiments of the present disclosure described above are not intended to limit the scope of the present disclosure. Any modifications, equivalent substitutions, and improvements made within the spirit and scope of the present disclosure are intended to be included within the protecting scope of the present disclosure.

The invention claimed is:

1. A lidar, comprising:
a plurality of laser transmitters configured to transmit laser light; and
an oscillating mirror configured to change a direction of a light path of the transmitted laser light,
wherein the laser light is orientated by the oscillating mirror in a horizontal direction and in a vertical direction to form an area array of laser light point clouds and have overlapping scanning areas corresponding to at least one subset of the plurality of laser transmitters,
wherein the at least one subset of the laser transmitters comprises two adjacent laser transmitters,
wherein the horizontal direction and the vertical direction are obtained relative to the plurality of laser transmitters, and
wherein the plurality of laser transmitters constitute a laser transmitter array of M rows and N columns, M being an integer greater than or equal to 2 and N being an integer greater than or equal to 2.

2. The lidar of claim 1, wherein:
laser light transmitted by a laser transmitter of the laser transmitters and a plane perpendicular to an entrance surface of a transmission collimator form a first included angle,
the laser transmitters in a same row of the plurality of laser transmitters have a same first included angle, and
the laser transmitters in different rows of the plurality of laser transmitters have different first included angles.

3. The lidar of claim 1, wherein:
laser light transmitted by any two adjacent laser transmitters in a same row of the laser transmitters forms a plurality of second included angles, each of the plurality of second included angles comprising a nonzero angle.

4. The lidar of claim 3, wherein the plurality of second included angles are identical for the laser transmitters in the same row.

5. The lidar of claim 3, wherein the plurality of second included angles are different for the laser transmitters in the same row.

6. The lidar of claim 1, further comprising:
a transmission collimator arranged between the laser transmitters and the oscillating mirror, and configured to collimate the laser light transmitted by the laser transmitters.

7. The lidar of claim 6, wherein a light exit of the plurality of laser transmitters is arranged at a focal plane of the transmission collimator.

8. A lidar control method, comprising:
transmitting, by a plurality of laser transmitters, laser light; and
changing, by an oscillating mirror, a direction of a light path of the transmitted laser light,
wherein the laser light is orientated by the oscillating mirror in a horizontal direction and in a vertical direction to form an area array of laser light point clouds and have overlapping scanning areas corresponding to at least one subset of the plurality of laser transmitters,
wherein the at least one subset of the laser transmitters comprises two adjacent laser transmitters,
wherein the horizontal direction and the vertical direction are obtained relative to the plurality of laser transmitters, and
wherein the plurality of laser transmitters constitute a laser transmitter array of M rows and N columns, M being an integer greater than or equal to 2 and N being an integer greater than or equal to 2.

9. The method of claim 8, wherein:
laser light transmitted by a laser transmitter of the laser transmitters and a plane perpendicular to an entrance surface of a transmission collimator form a first included angle,
the laser transmitters in a same row of the plurality of laser transmitters have a same first included angle, and
the laser transmitters in different rows of the plurality of laser transmitters have different first included angles.

10. The method of claim 8, wherein:
laser light transmitted by any two adjacent laser transmitters in a same row of the laser transmitters forms a plurality of second included angles, each of the plurality of second included angles comprising a nonzero angle.

11. A lidar, comprising:
a plurality of laser transmitters configured to transmit laser light; and
an oscillating mirror configured to orientate the laser light to have overlapping scanning areas corresponding to at least one subset of the plurality of laser transmitters, the at least one subset of the laser transmitters comprising two adjacent laser transmitters of the laser transmitters,
wherein the plurality of laser transmitters constitute a laser transmitter array of M rows and N columns, M being an integer greater than or equal to 2 and N being an integer greater than or equal to 2,
wherein the laser transmitters in a same column of the laser transmitters are configured to transmit laser light at different first included angles each between respective laser light and a plane perpendicular to an entrance surface of a transmission collimator between the plurality of laser transmitters and the oscillating mirror, and
wherein laser light transmitted by any two adjacent laser transmitters in a same row of the laser transmitters forms second included angles, a first one of the second included angles being equal to a second one of the second included angles.

* * * * *